No. 863,875. PATENTED AUG. 20, 1907.
S. A. REED.
SYSTEM OF SELECTIVE ELECTRIC SIGNALING.
APPLICATION FILED AUG. 4, 1906.
2 SHEETS—SHEET 1.
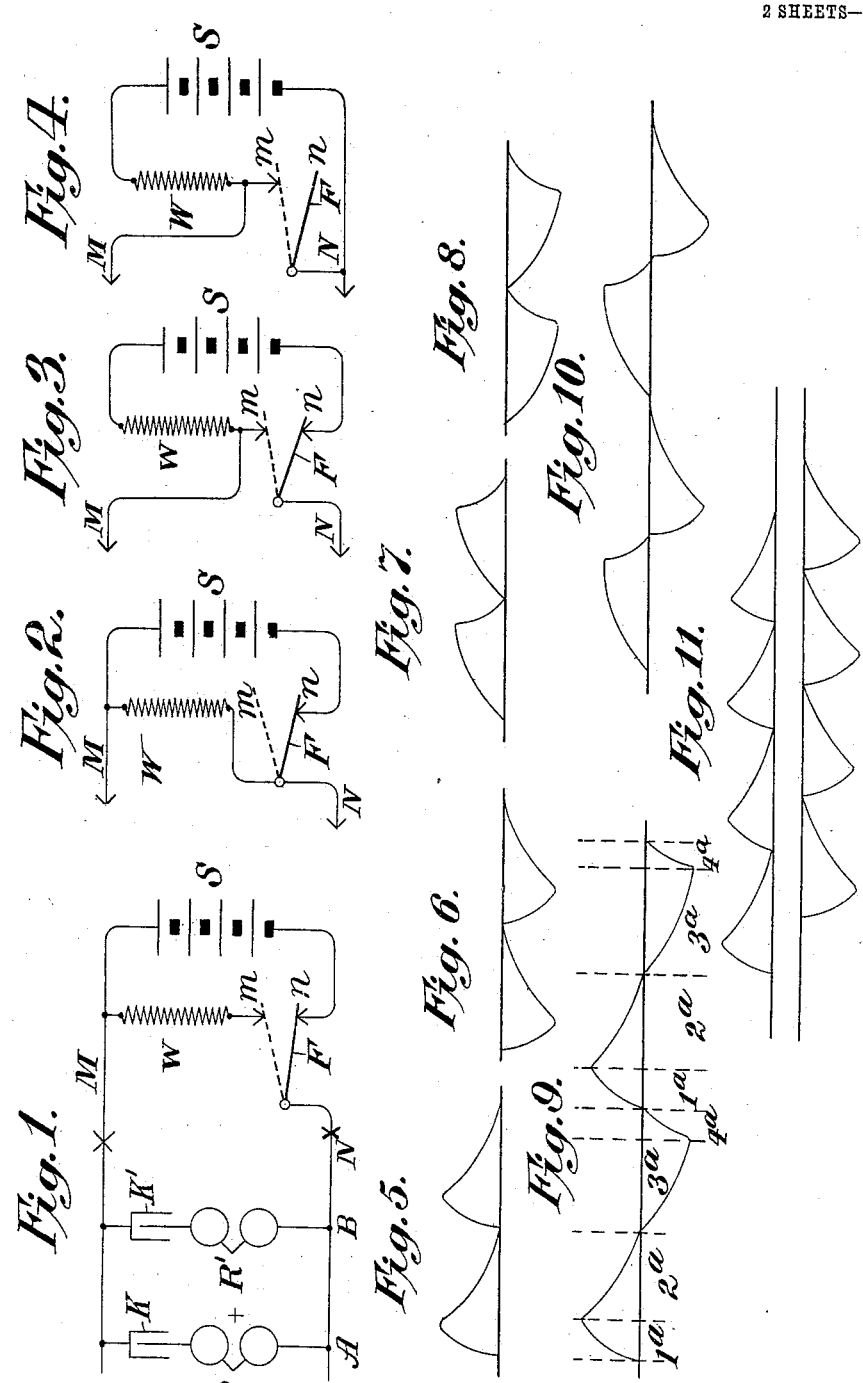

No. 863,875. PATENTED AUG. 20, 1907.
S. A. REED.
SYSTEM OF SELECTIVE ELECTRIC SIGNALING.
APPLICATION FILED AUG. 4, 1906.
2 SHEETS—SHEET 2.
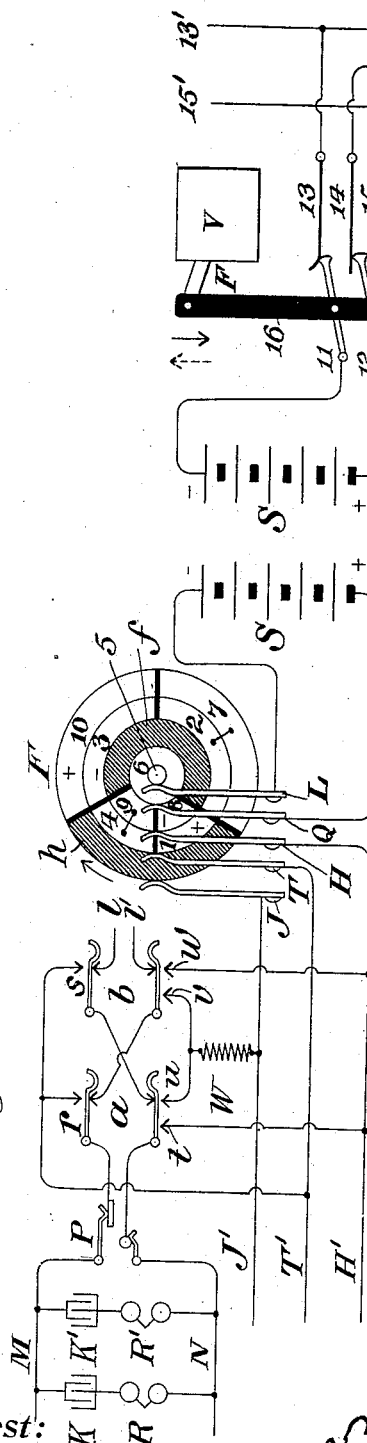
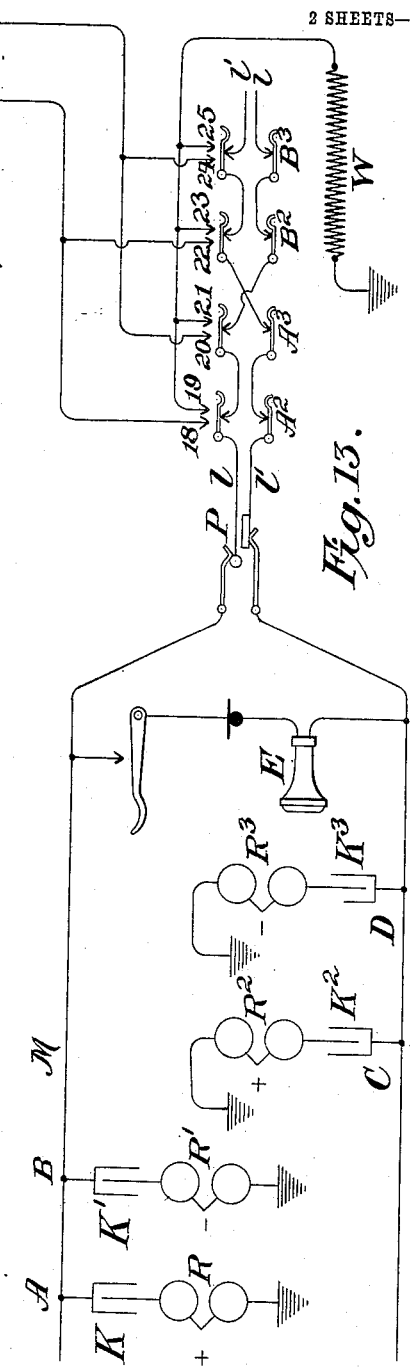
Fig. 12.
Fig. 13.
Attest:
Inventor:
Sylvanus Albert Reed
by
Attys.

UNITED STATES PATENT OFFICE.

SYLVANUS ALBERT REED, OF NEW YORK, N. Y.

SYSTEM OF SELECTIVE ELECTRIC SIGNALING.

No. 863,875.      Specification of Letters Patent.      Patented Aug. 20, 1907.

Application filed August 4, 1906. Serial No. 329,159.

*To all whom it may concern:*

Be it known that I, SYLVANUS ALBERT REED, a citizen of the United States, and a resident of New York city, New York, (whose post-office address is 17 Battery Place, New York city, New York,) have invented certain new and useful Improvements in Systems of Selective Electrical Signaling, of which the following, taken in conjunction with the accompanying drawings, is a full, clear, and concise specification.

My invention relates to improvements in systems of selective electrical signaling and involves certain relations of parts and principles of operation which are specially applicable to selective telephone signaling on party lines of so-called common battery type, wherein the line conductors are normally on open circuit and the sub-station signal receiving annunciators are biased bells or ringers in condenser-broken bridges across the line or from one or the other or both sides of the line to ground.

Methods have been proposed for impressing upon such circuits a special form of variable current which in coöperation with the condensers will result in alternating currents through the bells whose strength is differentiated, to a preponderance, positively or negatively, in adaptation to the tension of the biasing springs, such that the currents will pass into the condensers at substantially a different rate from that at which they emerge therefrom, and such currents have been supplied from batteries by the use of sliding contact pieces which permit of delivering to the line, current which has a periodic cycle of potential variation, and also by magneto or dynamo generators.

My present invention discloses a new system and means for producing selective alternating currents through the bells, as above described, which has, among other advantages, the special advantage of being easily operated if required, by oscillating instead of rotating mechanism.

It consists, briefly, of a common battery circuit of the character described, a suitable source of current and a vibrating or other switch, which alternately connects the current source with the circuit through a low resistance for charging the condensers and then with a high resistance through which the condensers are discharged or else charges the condensers through the high resistance and discharges them through a low resistance.

Referring to the accompanying drawings:—Figure 1 is a diagrammatic representation of the principle of my system, in which the switch first connects a battery direct with the circuit to charge the condensers and then disconnects the battery and connects a high resistance through which the condensers discharge. Fig. 2 represents a modification of the plan of Fig. 1, in which the high resistance remains bridged across the circuit during the process of charging. Fig. 3 is a diagrammatic representation of the principle of my invention, in which the switch so operates that the condensers are charged through a high and discharged through a low resistance. Fig. 4 represents a modification of the plan of Fig. 3, in which the battery is not cut out during the discharge. Figs. 5, 6, 7, 8, 9, 10 and 11 represent graphic wave forms pertaining to the various circuits described. Fig. 12 illustrates a modification of the system, in which an alternating current is impressed upon the circuit. Fig. 13 is a representation of a 4-party line with cord circuit and selective ringing keys connecting a periodically operated switch which effects a charge through a low and discharge through a high resistance, with a circuit similar to that of Fig. 2.

Referring to Fig. 1, M, N represent the two conductors of a multiple station line, such as a telephone party line, adapted to be connected with a battery or other direct current source S. A, B are subscribers' stations, at which are the polarized ringers R, $R^1$, biased respectively positively and negatively and included in bridges from M to N, which bridges are interrupted conductively by condensers K, $K'$ respectively. The conductor M connects directly with one pole, for the sake of illustration the negative, of battery S. The conductor N connects with the switch F, which oscillates or vibrates between the contact $n$ connected with the positive pole of battery S and the contact $m$, which contact is at the end of a resistance W branching from conductor M. When switch F contacts with contact $n$, the condensers become charged, and when it contacts with $m$ the battery S is out of circuit and the condensers discharge through resistance W. The current strength at charge will be greater than that at discharge, but provided the duration of contact at $m$ is sufficient, the same quantity of electricity will pass in both charge and discharge. If switch F oscillates with uniform frequency, then, for a stated line resistance, condenser capacity and battery voltage and polarity, the number of ohms of resistance W and the duration of contacts with $m$ and $n$ may be made such that the resulting alternating current in the circuit will be of an asymmetric character such as is represented graphically by Fig. 5 or Fig. 6, and which is suitable for the selection of one of the ringers, for example, R, at a given bias tension. For example, if the resistance of the ringers R, $R^1$ is about 2500 ohms each, the capacity of the condensers K, $K^1$ about 2 microfarads each, the line resistance about 100 ohms, the voltage of battery S about 75 volts, and the frequency of switch S about 1000 per minute, then for a convenient bias tension of R, R' it is found that a broad selective range may be obtained by assigning to W a non-inductive resistance of about 5000 ohms, and making the contact n about 1/3 and the contact m about 2/3 of the oscillation period. This affords the condition of sudden charge and gradual discharge favorable for a good selection.

Figs. 2, 3 and 4 illustrate modifications of the plan of Fig. 1, and for convenience the portion of the circuit to the left of the marks x in Fig. 1 is omitted in Figs. 2, 3 and 4, and these portions may be supposed connected at the arrow-heads in the latter figures. In Fig. 2 the resistance W is allowed to remain bridged across the circuit when switch F is in contact with n. This will have a negligible effect in reducing the charging current but simplifies the switching mechanism. When the switch F moves to position m, the battery circuit is open and the condensers discharge through W, as in the case of Fig. 1. The graphic form of the waves in the case of Fig. 2 will also be of the type represented in Figs. 5 and 6. In Fig. 3 the same notation applies as in the cases of Figs. 1 and 2, excepting that conductor M instead of connecting directly with one pole of battery S connects therewith through the resistance W, and contact m connects directly with line M and not therewith through resistance W. When switch F is at contact n the condensers are charged through the resistance W but when F is at contact m both battery and resistance W are out of circuit and the condensers discharge directly through contact m with the line resistance only. In this case we have gradual charge and sudden discharge, and as in the case of Fig. 1, values may be found for the number of ohms of W, and the duration of contacts at m and n adapted to produce an alternating current in the circuit suitable for selection of one of the ringers R, R¹, namely such a current as can be represented graphically by Figs. 7 or 8. In Fig. 4 the battery S is not cut out while the switch F is at position m but remains in a branch of the circuit. The switch F when at m will offer a path of such low resistance compared to that through the battery that the full discharge will not be appreciably prevented. There is, of course, the disadvantage of a slight waste of current while P is at m due to the closed circuit through W, but, on the other hand, this plan offers some advantages in simplification of the switching mechanism.

In the cases of Figs. 1, 2, 3, 4 it is plain that a reversal of the battery polarity or of the line connections at x will reverse the nature of the relation of the respective ringers R, R' to the circuit, and that one or the other of the ringers may thereby be selected. These conditions are represented by Figs. 5 and 6, in which Fig. 5 represents a sudden positive charge followed by a slow discharge, and Fig. 6 a sudden negative charge followed by a slow discharge. Similarly Fig. 7 represents a slow positive charge followed by a sudden discharge and Fig. 8 represents a slow negative charge followed by a sudden discharge.

The types of Figs. 1 and 3 may be combined in a manner represented by Fig. 12, in which l', l' are the strands of a telephone switchboard cord which may lead from the poles of a common battery, l' leading to the tip, and l to the sleeve, of a plug P adapted to engage with the terminal jack of a 2-party telephone line having two stations bridged across it similar in arrangement to those shown at A and B in Fig. 1, a and b are selective ringing keys which when operated close the contacts r, s, t, u, v, w. W is a high resistance. F is a commutating switch, having metallic segments 1, 2, 3, 4, 7, 8, 9, 10, insulating segments f and h and collector rings 5 and 6. Bearing against appropriate parts of the above are brushes H, J, Q, L, T. L connects with the negative and Q with the positive pole of battery or other direct current source S. A conductor leads from T to contacts r, s. A conductor leads from J to resistance W, and thence to contacts u and v. A conductor leads from H to contacts t and w. The conductors from H, J and T may also supply through conductors H', J', T' similar keys on other switchboard cords, but for each cord there should preferably be a separate resistance W. Segments 1 and 10 have permanent conductive connection with collector ring 6, and therefore through brush Q with the positive pole of battery S, while segments 3 and 8 have permanent conductive connection with collector ring 5, and therefore through brush L with the negative pole of battery S. The connections are not shown but are indicated by the polarity signs in the respective segments. Segments 2 and 7 have permanent conductive connection with each other. Segments 4 and 9 have also permanent conductive connection with each other. The cycle of currents due to a single rotation will be in four periods and is illustrated graphically in Fig. 9, showing two cycles, in each of which the 4 periods are distinguished by the four tracts separated by dotted lines and marked 1ª, 2ª, 3ª, 4ª, corresponding respectively to brush contacts with segments 1, 2, 3, 4 of Fig. 12. The angular dimensions of the segments may conveniently bear such relation that 2, 7, 3 and 10 are twice 1, 4, 8, 9, and that f is twice h. The angular relation determines and controls the duration of the periods of charge and discharge. If now the commutator be caused to rotate at uniform rate in the direction of the arrow, then in a single rotation the cycle of four periods will be as follows: Beginning at the position shown in Fig. 12 and supposing key a is operated:

*First period.*—Brush J is on an insulating segment h and therefore W is out of circuit. Positive current will flow from segment 1 through brush T, contact r, sleeve of plug and line wire M to the upper plates of condensers K, K'. Negative current will flow through brush H, contact t, tip of plug P and line wire N to lower plates of condensers K, K'. Strong positive current will flow downwards through the ringers R, R' during this low resistance positive charging period represented by tract 1ª in Fig. 9.

*Second period.*—Brush H is on blank segment f. Brushes J and T are in contact with connected segments 7, 2. The condensers therefore discharge through high resistance W and the period is represented by tract 2ª in Fig. 9, during which weak negative current will flow through the ringers.

*Third period.*—The condensers are charged negatively through resistance W, this period being represented by tract 3ª in Fig. 9, during which weak negative current will flow through the ringers.

*Fourth period.*—The condensers are discharged through a low resistance, this period being represented by tract 4ª in Fig. 9, during which strong positive current will flow through the ringers. Thus periods 4, 1, are associated with strong positive current through the ringers, while periods 2, 3 are associated with weak negative currents through the ringers. The tension of the oppositely biased ringers can be adjusted to selection of one ringer exclusively; for example, R by the above cycle of currents controlled by operation of key $a$. If key $b$ should be operated instead of key $a$ the same cycle will follow but with polarities reversed so far as the ringers are concerned, and therefore the other ringer B will be selected. The system illustrated in Fig. 12 may have certain advantages in doubling the effect upon the ringers of a given current source or with a given limit of line voltage.

The cycle resulting from operation of key $b$ is represented graphically in Fig. 10, showing two cycles.

In Fig. 13 is shown a modification of the circuit of Fig. 1, of convenient application to certain types of exchange equipment. M, N, are the line conductors of a telephone party line having 4 stations A, B, C, D. At A and B are positively and negatively biased ringers R, R′, respectively in ground branches from M through condensers K, K′. At C, D, are positively and negatively biased ringers $R^3$, $R^4$, respectively in ground branches from N through condensers $K^3$, $K^4$. Line M, N, terminates in a jack at the exchange, the line signal and cut-off systems being omitted from the figure for the sake of convenience. $l$, $l'$ are the strands of a switchboard cord circuit which may lead respectively from the two poles of a common battery not shown in the figure, terminating in plug P. Cut-off circuits, supervisory and other usual appurtenances of the cord circuit are omitted from the figure for the sake of convenience, except keys $A^2$, $A^3$, $B^2$, $B^3$, which are selective ringing keys adapted to ring selectively the bells at A, A′, B, B′ respectively according to the connection which each key may make when operated. E is a telephone receiver with a transmitter and a hook switch all adapted to be bridged across the line in any manner usual in the art, and such a talking circuit may be located at each station A, B, C, D. S is a battery or other source of direct current whose poles connect with the blades 11 and 12 of a double pole switch, moving between spring contacts 13, 14 and 15 so that when up, 11 touches 13 and 12 touches 14, but when down 11 touches 14 and 12 touches 15. 11 and 12 are united by the insulating yoke 16, to which is imparted an oscillatory motion up and down by the arm of a vibrator V which may be of any convenient type electrical, mechanical or otherwise. Means familiar in the art may be provided in the vibrator V to adjust the frequency of the contacts, while their duration may be controlled by an adjustment of the springs, 13, 14 and 15. Spring 14 connects to ground. Spring 13 connects to key contacts 3 and 7, and spring 15 connects to key contacts 18 and 22. Branches 13′ and 15′ may lead to similar key contacts on other cords. W is a non-inductive resistance individual to this cord $l$, $l'$, there being a similar resistance for each cord in the exchange. Resistance W is in a ground branch which leads to key contacts 19, 21, 23 and 25. When key $A^2$ is alone operated, supposing switch F is in oscillation, then while L is down the positive pole of battery S connects through switch member 12 with spring 15, key contact 18 to cord strand $l$, line conductor M and condensers K, K′. The negative end of battery S during this time is connected to ground through switch member 11 and contact spring 14. While 16 is up key $A^2$ being still alone in operation the negative pole of battery S connects through 11 and 13 with the open contacts 20 and 24 only, therefore the battery is out of circuit so far as line M, N is concerned. In both the up and down positions of 16 during the operation of key $A^2$ resistance W remains in a ground branch from line conductor M through key contact 19 therefore the circuit between M and ground, as may be seen by examination, is the same as that illustrated in Fig. 2, and therefore the resulting current may be represented graphically by Fig. 5 or by Fig. 11 (upper diagram). If on some other cord a key is being operated at the same time putting conductor 13′ in circuit, current of character represented by Fig. 6 will flow in that circuit. This is illustrated at Fig. 11 (lower part), and it is seen that the cycles through the conductors 15 and 13 follow each other alternately. If key $A^3$ is operated instead of key $A^2$, then the circuit, though still from M to ground, yet experiences the current represented by Fig. 11 (lower part) instead of that represented by Fig. 11 (upper part) and the effect upon the ringers is the reverse in polarity to that represented by Fig. 11 (upper part). which current is obtained by operating key $A^2$. Therefore the oppositely biased ringers R, R′ may be adjusted to a bias tension such that one will respond exclusively to key $A^2$ and the other to key $A^3$. What is true of the circuit M to ground is clearly true also of the circuit N to ground, and the current connections to this circuit are controlled by keys $B^2$ and $B^3$ in substantially the same manner as those of circuit M to ground are controlled by keys $A^2$ and $A^3$. The bias tensions of ringers $R^2$ and $R^3$ are adjusted to respond exclusively, one to key $B^2$ and the other to key $B^3$. Fig. 13 thus illustrates the application of circuit of Fig. 2 in practice, but a four-party line such as that represented in Fig. 13 may also be operated selectively by currents of the character described in connection with Figs. 1, 3, 4, 7, 8 or 13 by making one of the line wires M or N in those figures a ground and making simple modifications of the switching connections.

Having described my invention what I claim and desire to secure by United States Letters Patent is the following:

1. In a system of selective signaling, a circuit having condensers, oppositely biased ringers in said circuit having predetermined tension in their biasing means, a low and a high resistance, and means for operating said ringers adapted for alternately charging and discharging the condensers respectively through said low and high resistance or vice versa, the said high resistance being sufficient to so reduce the current as that the same will be insufficient to overcome the tension of the biasing means.

2. In a selective system, a circuit containing condensers and oppositely biased ringers respectively in series, a source of current and a resistance, in combination with a periodic switching means adapted to charge and discharge said condensers and connected with said resistance to alternately include the same in the condenser circuit, the said resistance being predetermined with respect to the other apparatus to render the current through the ringers inferior in motor strength to the tension of the biasing means.

3. In a selective system, a circuit containing condensers and oppositely biased ringers respectively in series, a source of current and a resistance, in combination with a periodic switching device for charging said condensers alternately with charges of opposite polarity and adapted to interpose said resistance into the condenser-circuit during the change from maximum positive charge to maximum negative charge or vice versa.

In testimony whereof, I have signed my name to the specification in the presence of two subscribing witnesses.

SYLVANUS ALBERT REED.

Witnesses:
   H. G. KIMBALL,
   A. A. LORZER.